US009002887B1

(12) United States Patent
Herrmann et al.

(10) Patent No.: US 9,002,887 B1
(45) Date of Patent: Apr. 7, 2015

(54) ADVERTISEMENT GENERATOR BASED ON EXTERNAL TRAFFIC (75) Inventors: Eric Alfred Herrmann, Snohomish, WA (US); Stephan G. Betz, Seattle, WA (US); Joel Andrew Shapiro, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1270 days.

(21) Appl. No.: 11/693,904

(22) Filed: Mar. 30, 2007

(51) Int. Cl.
*G06F 17/30* (2006.01)
(52) U.S. Cl.
CPC .................................. *G06Q 30/0356* (2013.01)
(58) Field of Classification Search
CPC ........................ G06F 17/30539; G06Q 30/0214
USPC .................... 707/709, 751, 767, 776; 705/14.5
See application file for complete search history.

(56) References Cited

U.S. PATENT DOCUMENTS

| | | | | |
|---|---|---|---|---|
| 2001/0037283 A1* | 11/2001 | Mullaney | ........................ | 705/37 |
| 2002/0147625 A1* | 10/2002 | Kolke, Jr. | .......................... | 705/9 |
| 2003/0177277 A1* | 9/2003 | Dascalu | ........................ | 709/313 |
| 2005/0033641 A1* | 2/2005 | Jha et al. | .......................... | 705/14 |
| 2005/0149390 A1* | 7/2005 | Scholl et al. | ..................... | 705/14 |
| 2005/0234781 A1* | 10/2005 | Morgenstern et al. | .......... | 705/26 |
| 2006/0173985 A1* | 8/2006 | Moore | .......................... | 709/223 |
| 2007/0038931 A1* | 2/2007 | Allaire et al. | ................. | 715/526 |
| 2008/0162371 A1* | 7/2008 | Rampell et al. | ................. | 705/80 |
| 2010/0042931 A1* | 2/2010 | Dixon et al. | ................... | 715/738 |

* cited by examiner

*Primary Examiner* — Robert Beausoliel, Jr.
*Assistant Examiner* — Alexandria Bromell
(74) *Attorney, Agent, or Firm* — Novak Druce Connolly Bove + Quigg LLP (57) ABSTRACT

An external traffic advertisement system is provided that generates advertisement sets based on analysis of visits to a web site that were referred by an external source. The advertisement system aggregates the referral information for each referral type. A referral type may be defined by one or more of keyword text derived from the query text of the referrals, landing page type, external source, product identifier, and so on. The advertisement system may, for each referral type, aggregate the total revenue from the visits of that referral type and may generate a count of the number of converting visits for that referral type. The advertisement system then identifies those referral types whose aggregated information satisfies an advertisement criterion and generates an advertisement set for each identified referral type with a keyword derived from keyword text and with a link based on the landing page type of the referral type.

26 Claims, 8 Drawing Sheets

FIG. 1 visits table 200

| query text | query string | landing page type | product id | browse node id | source id | revenue |
|---|---|---|---|---|---|---|
| jewel of the nile | sort = title | product | 34HZ21 | | source 1 | $14.95 |
| studying astronomy | option = books | browse node | | 71092 | source 3 | 0 |
| jewelry diamond | | search | A96123 | | source 10 | $4,275.00 |
| ... | ... | ... | ... | ... | ... | ... |
| | | | | | | |

*FIG. 2*

| referral type table 300 | landing page type | query string | browse node id | source id | product identifier | revenue | visits | converting visits |
|---|---|---|---|---|---|---|---|---|
| keyword text | | | | | | | | |
| jewel nile | product | sort = title | | source 1 | | $3,475 | 4200 | 390 |
| jewel nile | product | sort = cost | | source 2 | | $250 | 625 | 26 |
| ... | ... | ... | ... | ... | ... | ... | ... | ... |

Columns "query string", "browse node id", "source id", and "product identifier" are grouped under "referral type".

ADVERTISEMENT GENERATOR BASED ON EXTERNAL TRAFFIC

TECHNICAL FIELD

The described technology relates generally to generating advertisements that are keyword-targeted.

BACKGROUND

Many search engine services, such as Google, Yahoo! and MSN, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books. When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with an advertisement and search terms. When a search request is received, the search engine service identifies the advertisements whose search terms most closely match those of the search request. The search engine service then may display some of the advertisements along with the search results. If more advertisements are identified than will fit on the first page of the search results, the search engine service may select to display on the first page those advertisements based on some criterion such as bid amount. In general, a search engine service or other advertisement placement service will display advertisements with higher bid amounts more prominently. For example, a list of sponsored links may be ordered by bid amount, the advertisement with the highest bid amount may be displayed in a prominent location (e.g., top of a web page), an advertisement with a high bid amount may be highlighted, and so on. The search engine services can either charge for placement of each advertisement along with search results (i.e., cost per impression) or charge only when a user actually selects a link associated with an advertisement (i.e., cost per click).

Many web sites receive referrals from other web sites. Such referrals can be a source of revenue for providers of both the referring web site and the referred web site. For example, a medical information web site that provides medical information may include links to refer users to a bookseller's web site through which users can purchase books. A link may refer a user to a detailed web page for a specific book, to a browse node web page through which the user can browse through lists of medical books, or to a search web page that provides search results for a query included in the link. The referred web site may track the activity of the referred user while visiting the web site. If the user makes a purchase during the visit (or session), the provider of the referred web site may compensate the provider of the referring web site for the referral. Thus, the compensation serves an incentive for the referring web site to continue referring users to the referred web site. The referred web site provider benefits from the referral since it increases its chances of selling its products. The referred web site may maintain a record of each referral in order to properly compensate the provider of the referring web sites and to assess the benefit of the referral program. Not all "referrals," however, need be compensated. For example, a search engine service may provide a link (i.e., not a sponsored link) to a web site as part of its search result. In such a case, the provider of the web site would not typically compensate the provider of the search engine service.

In addition to receiving referrals, a web site provider may also place advertisements for the web site with order placement services such as search engine services. As an advertiser, the provider of a web site would like to maximize the effectiveness of advertising dollars used to pay for advertisements. Thus, advertisers try to identify keyword and advertisement combinations that result in the highest benefits (e.g., most profit) to the advertiser. Many techniques have been developed to identify keywords that may be appropriate for advertising various items. For example, some techniques analyze "clickthrough logs" to identify keywords of search requests submitted by users and the items of sponsored links that the users selected. If many search requests with a common keyword result in users selecting sponsored links for the same item, then a vendor may want to place an advertisement for that item or for the category (e.g., DVDs and books) of that item with results of search requests that contain that search term.

Some techniques also select search terms based on a "conversion rate" for a search term and an item. A conversion rate is a measure of the percentage of clickthroughs to the item resulting in an actual purchase of an item. Conversion rate, however, is more generally the percentage of clickthroughs that result in some desirable benefit to a vendor or an organization. For example, the conversion rate for an insurance company may be a measure of the percentage of clickthroughs that result in the user requesting a rate quote.

Because clickthrough logs collected over months and years provide a detailed and extensive picture of user activity relating to search terms, the techniques that mine the clickthrough logs for keyword and item combinations or keyword and category of items combination for advertisement purposes have been effective. These techniques, however, tend to be slow to react to rapid changes in user activity. For example, when a new medical breakthrough is announced, an advertiser may not have attempted to place advertisements based on keywords appropriate for the medical breakthrough. Indeed, it may take a considerable amount of time for the advertiser to detect user interest in the breakthrough and place related advertisements. Many special-purpose web sites, however, may experience a rapid change in user activity due to recent events (e.g., an announced visit of a dignitary). For example, users may visit a medical information web site to obtain more information about the medical breakthrough. Because the medical information web site focuses solely on medical information, it may experience a rapid increase in traffic related to the breakthrough after the announcement. The medical information web site may refer its users to a bookseller's web site using a query relating to the breakthrough. For example, if the breakthrough relates to a cure for breast cancer, users may submit queries such as "breast cancer cure Mayo clinic." When the bookseller's web site receives the referral, it searches for books that match the query and provides to the user a web page with the books listed. As described above, however, the bookseller's reliance on analysis of clickthrough logs will not typically be able to quickly detect the increased user activity.

SUMMARY

An external traffic advertisement system is provided that generates advertisement sets based on analysis of visits to a web site that were referred by an external source. Each visit may have associated referral information that includes a query text, a landing page type, product identifier, revenue, and so on. The query text may represent the search request input by the user at the external source. The product identifier may represent a product that was the subject of a product landing page. The advertisement system aggregates the referral information for each referral type. A referral type may be defined by one or more of the elements that includes keyword text derived from the query text of the referrals, landing page type, external source, product identifier, and so on. The advertisement system may, for each referral type, aggregate the total revenue from the visits of that referral type and may generate a count of the number of converting visits for that referral type. The external traffic advertisement system then identifies those referral types whose aggregated information satisfies an advertisement criterion and generates an advertisement set for each identified referral type with a keyword derived from the keyword text and with a link based on the landing page type of the referral type. The advertisement system then submits the advertisement sets to an advertisement placement service for placement.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION

A method and system for generating advertisements based on analysis of traffic from external sources is provided. In one embodiment, an external traffic advertisement system is implemented as part of an advertisement placement system that includes multiple advertisement generators that automatically create advertisement sets. An advertisement set contains an advertisement, a search term or keyword, and/or a link to advertised item(s). Different advertisement generators use different algorithms to automatically generate (or "create") advertisements (also referred to as the "creative"), identify search terms, and/or create links to form advertisement sets. The advertisement placement system may include an advertisement manager that receives advertisement sets from the advertisement generators, identifies a fee or bid amount to be associated with each advertisement set, and selects which advertisement sets are to be submitted to various advertisement placement services (e.g., search engine services). Advertisement sets may be automatically generated and automatically placed with advertisement placement services to help achieve an advertiser's objectives. An advertisement placement system is described in U.S. patent application Ser. No. 10/748,759, entitled "Method and System for Generating Keyword-Targeted Advertisements," which is hereby incorporated by reference.

The external traffic advertisement system generates advertisement sets based on information collected from external sources. The information collected from an external source may include query text and landing page type. The external traffic advertisement system may aggregate referral information (e.g., resulting revenue) for each "referral type." A referral type may be each unique combination of query text, external source, landing page type, product identifier, and so on. The external traffic advertisement system may generate an advertisement set for a referral type that includes a keyword from the query text, an advertisement, and a link to a web page of the landing page type. The external traffic advertisement system then submits the advertisements to be placed along with any type of content that has associated keywords. Such advertising is referred to as "keyword-targeted advertising." A search term associated with a search result is an example of such a keyword, and the search result is an example of the content. One skilled in the art will appreciate that the advertisements generated by the external traffic advertisement system can be submitted to an advertisement placement service for placement in contexts other than a search engine service, such as while content is being streamed to a client, on a web page through which a product can be purchased, and so on.

In some embodiments, the external traffic advertisement system (also referred to as "the external traffic advertisement generator," "the advertisement system," or "the system") generates advertisement sets based on analysis of visits to a web site that were referred by an external source (e.g., referring web site). Each visit may have associated referral information that includes a query text, a landing page type, product identifier, revenue, and so on. The query text may represent the search request input by the user at the external source. The product identifier may represent a product that was the subject of the detailed landing page. The advertisement system aggregates the referral information for each referral type. A referral type may be defined by one or more of the elements that include keyword text derived from the query text of the referrals, landing page type, external source, product identifier, query string, browse node identifier, product identifier, and so on. A query string represents the optional parameters included with the query. For example, an external source may indicate in a query string to order the query results alphabetically, by cost, or by relevance. The advertisement system may, for each referral type, aggregate the total revenue from the visits of that referral type and may generate a count of the number of total visits and number of converting visits for that referral type. The external traffic advertisement system then identifies those referral types whose aggregated information satisfies an advertisement criterion. For example, the advertisement criterion may be that the total revenue for the referral type may be greater than a revenue threshold, that the number of converting visits be greater than a visit threshold, and/or that the conversion rate be greater than a conversion rate threshold. The advertisement system then generates, for each referral type that satisfies the advertisement criterion, an advertisement set with a keyword derived from keyword text and with a link based on the landing page type of the referral type. The advertisement system then submits the advertisement sets to an advertisement placement system for placement.

In some embodiments, the external traffic advertisement system may add to an advertisement set for a referral type a link that corresponds to the landing page type of the referral type. A landing page of an advertisement set is the page that is displayed when a user selects the advertisement. For example, if the landing page type of a referral type is product, then the advertisement system may add a link to a product detail web page for the product identified by the product identifier of the referral type. Thus, when the advertisement of the advertisement set is placed, a user who selects the advertisement will be provided with a product detail web page for the product that describes an individual product and may allow the user to purchase the product. If the landing page type is browse node, then the advertisement system may add a link to the browse node of the referral type. A browse node is a node within a hierarchical classification of products that forms a browse tree. For example, a classification of shirts may have sub-classifications of dress shirts, T-shirts, sports shirts, and so on. The dress shirt classification may itself have sub-classifications of short sleeve and long sleeve. Each node of the browse tree may have a web page that allows a user to browse up and down the hierarchy. The link contains a reference to the web page of a specific browse node. Similarly, if the landing page type is search, the advertisement system may add a link to a search web page with the keyword text as the query. The advertisement system may also add the query string of the referral type to the links to the browse node and the search web page so that the results can be formatted accordingly.

In some embodiments, the external traffic advertisement system may calculate bid amounts for the advertisement sets of the referral types. The advertisement system may base the bid amount on various factors such as the conversion rate of the referral type, revenue of the referral type, profitability associated with the referral type, percentage of revenue to be spent on advertising, category of the item being advertised, average revenue per converting visit, and so on. The advertisement system may have different bid amount levels and use the factors to identify the appropriate level. For example, the advertisement system may have a low (e.g., $0.10), medium (e.g., $0.50), and high (e.g., $2.00) bid amount level. The advertisement may round the bid amount calculated based on the factors to the nearest bid amount level. For example, a bid of $0.05 might be increased to $0.10, and a bid of $5.00 might be decreased to $2.00. If a bid amount does not meet a bid threshold (e.g., $0.02), the external traffic advertisement system might not submit the advertisement set. For example, if the bid amount is calculated based on conversion rate and the conversion rate is very low, then the bid amount may not reach the bid threshold.

Figure 1:
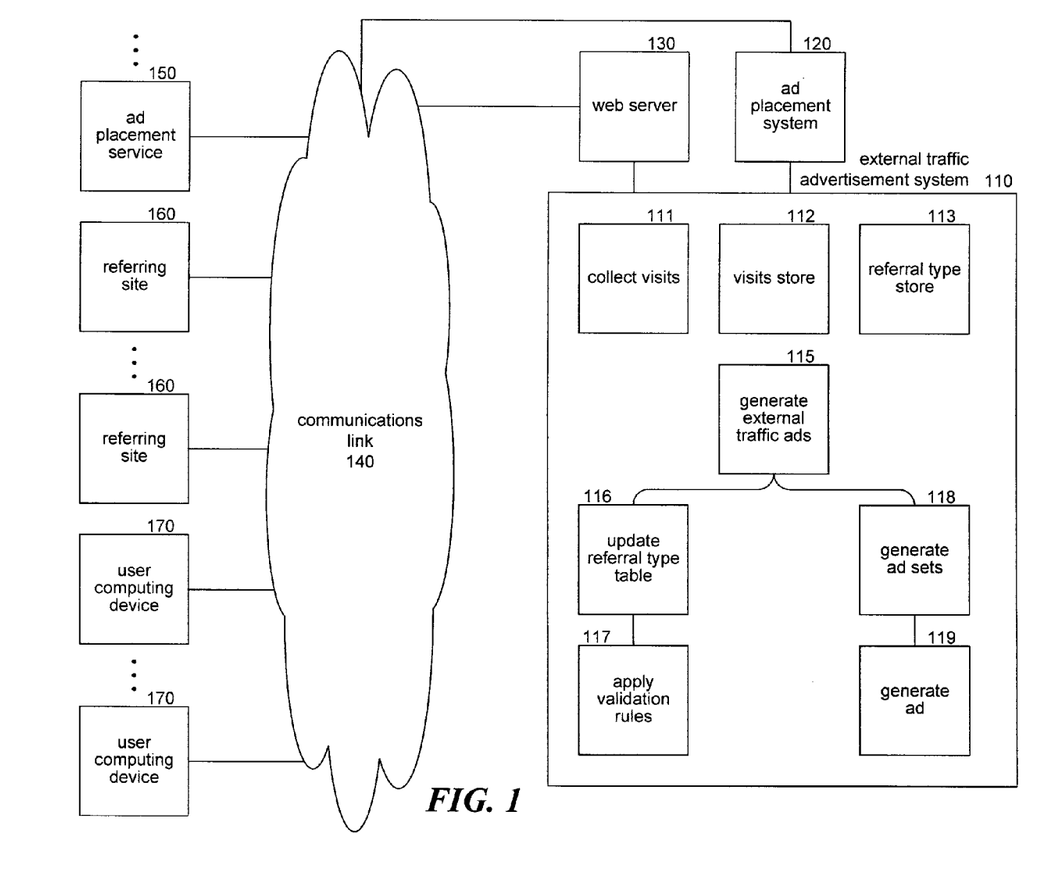
FIG. 1 is a block diagram that illustrates components of the external traffic advertisement system in one embodiment.

FIG. 1 is a block diagram that illustrates components of the external traffic advertisement system in one embodiment. The external traffic advertisement system 110 is connected to an advertisement placement system 120 and a web server 130. The web server 130 is connected to the referring sites 160 and user computing devices 170 via a communications link 140. Users at the user computing devices 170 access web pages of the referring sites 160. When a user selects a referral link of a web page, the user is presented with a web page generated by web server 130. The web server logs an indication of the referral and allows the user to conduct a commercial transaction with the web site. The external traffic advertisement system 110, after generating advertisement sets based on analysis of the referrals, submits the advertisement sets to the advertisement placement system 120. The advertisement placement system 120 in turn submits the advertisement sets to an advertisement placement service 150 via the communications link 140.

The external traffic advertisement system 110 includes a collect visits component 111 and a visits store 112. The collect visit component 111 may collect from the web server 130 referral information for each visit and store the referral information in the visits store 112. The referral information received from the web server 130 may identify for each visit the revenue, if any, derived from the visit. The visits store contains an entry for each referral. The external traffic advertisement system 110 also includes a referral type store 113 that includes an entry for each referral type.

The external traffic advertisement system 110 includes a generate external traffic advertisement sets component 115, an update referral type table component 116, an apply validation rules component 117, a generate advertisement sets component 118, and a generate advertisements component 119. The generate external traffic advertisement sets component 115 invokes the update referral type table component 116 to update the referral type store 113 based on the data of the visits store 112. The update referral type table component 116 invokes the apply validation rules component 117 to validate each entry of the visits store 112 before updating the referral type store 113. The generate external traffic advertisement sets component 115 then invokes the generate advertisement sets component 118 to generate advertisement sets for the referral types of the referral type store 113. The generate advertisement sets component 118 invokes the generate advertisement component 119 to generate an advertisement.

Figure 2:
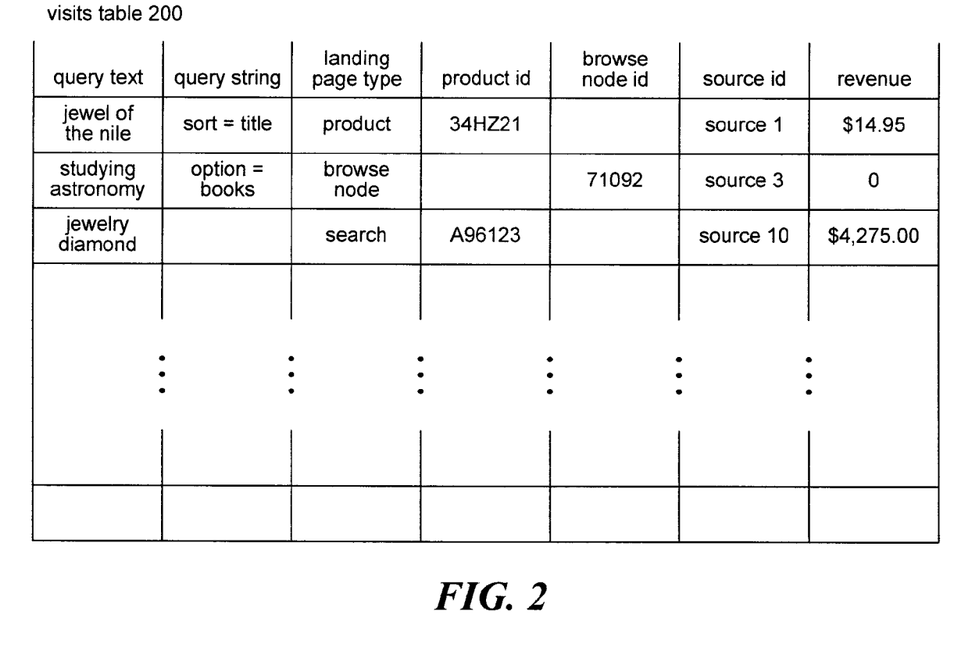
FIG. 2 is a block diagram that illustrates the logical organization of a visits table of a visits store in one embodiment.

FIG. 2 is a block diagram that illustrates the logical organization of a visits table of a visits store in one embodiment. The visits table 200 includes an entry for each visit. Each entry may include a query text field, a query string field, a landing page type field, a product identifier field, a browse node identifier field, a source identifier field, and a revenue field. The query text field contains the text of the query included in a referral link (e.g., "Jewel of the Nile"). The query string field contains the query parameters of the referral link (e.g., "sort=title"). The landing page type field identifies the type of the landing page of the referral link (e.g., product, browse node, search). The product identifier field contains an identifier (e.g., stock keep unit) of the product that was the subject of a detailed landing page. If the landing page is not a detailed page, then the product identifier field may be empty. The browse node identifier field identifies the browse node of a browse hierarchy of the web site to which the referral link points. If the landing page type is product or search, the browse node field may be empty. The source identifier field identifies the external source (e.g., source 1 or source 3). The revenue field indicates the actual revenue or imputed revenue (e.g., $14.95) received by the web site during the visit. If no revenue was received, then the revenue is zero and the visit is a non-converting visit. Imputed revenue may represent the value of the user activity to the web site other than actual revenue received during the visit. For example, if a user signs up to rent DVDs during a visit, then the web site may assign a value to such activity. The advertisement system may also use other financial metrics such as profit.

Figure 3:
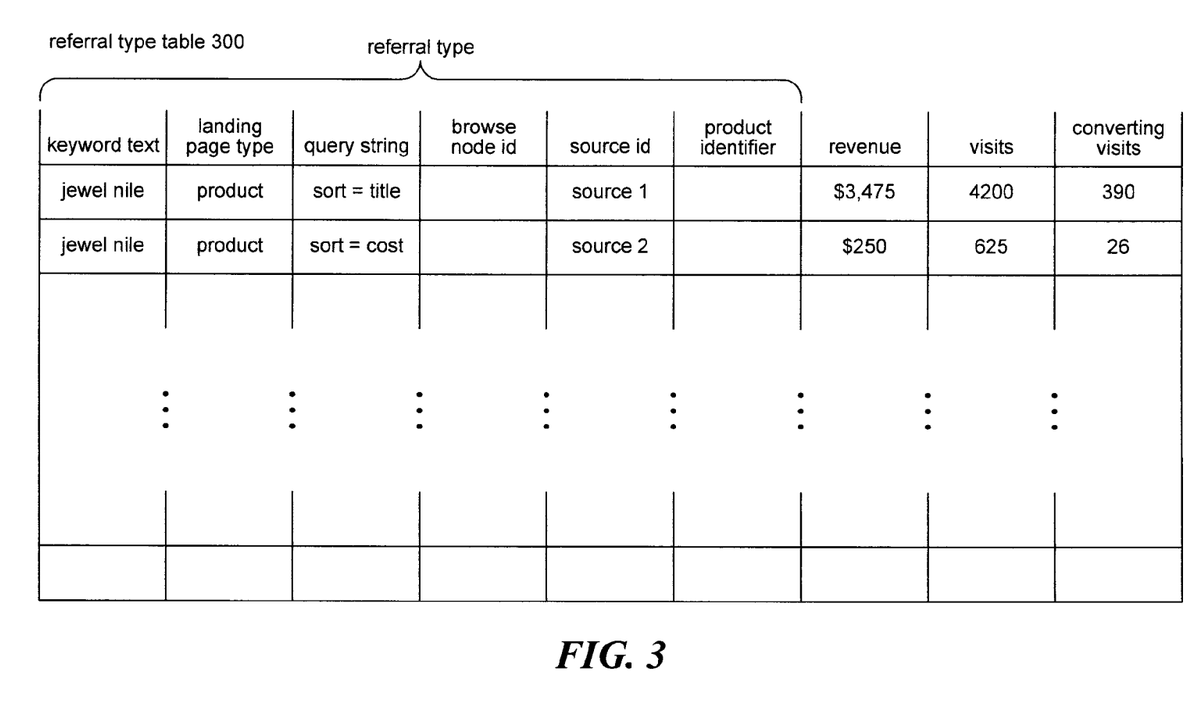
FIG. 3 is a block diagram that illustrates the logical organization of a referral type table of the referral type store of the external traffic advertisement system in one embodiment.

FIG. 3 is a block diagram that illustrates the logical organization of a referral type table 300 of the referral type store of the external traffic advertisement system in one embodiment. The referral type table 300 includes an entry for each referral type. Each entry includes a keyword text field, a landing page type field, a query string field, a browse node identifier field, a source identifier field, a product identifier field, a revenue field, a visits field, and a converting visits field. Each referral type is uniquely identified by a combination of the keyword text field, the landing page type field, the query string field, the browse node identifier field, the source identifier field, and the product identifier field. One skilled in the art will appreciate that the referral type can be defined by using any subset of these fields or using additional fields. For example, if a referring web site can only refer to a product detail page, then the landing page type field, the query string field, and the browse node identifier field may be omitted from the table. This combination may be referred to as a referral type field. The keyword text field may contain a normalized version of the query text from the visits table 200. For example, a normalized version may have noise words (e.g., articles and prepositions) removed, words stemmed, and so on. The revenue field contains an aggregation of the revenue of the visits for the referral type. The visits field contains the number of visits for the referral type. The converting visits field contains a number of converting visits for the referral type.

The computing devices on which the external traffic advertisement system 110 may be implemented may include, among other components, a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the functions of the system. In addition, the instructions, data structures, and message structures may be stored or transmitted via a data transmission medium, such as a signal on a communications link 140. Various communications links 140 may be used, such as the Internet, a local area network, a wide area network, or a point-to-point dial-up connection. The system may be implemented on various computing systems or devices including personal computers, server computers, multiprocessor systems, microprocessor-based systems, network PCs, mini-computers, mainframe computers, distributed computing environments that include any of the above systems or devices, and the like.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The functionality of the components of the system in this description is described to help facilitate an understanding of the system. For example, the external traffic advertisement system 110, the advertisement placement system 120, and the web server 130 may execute on the same or different computer systems.

Figure 4:
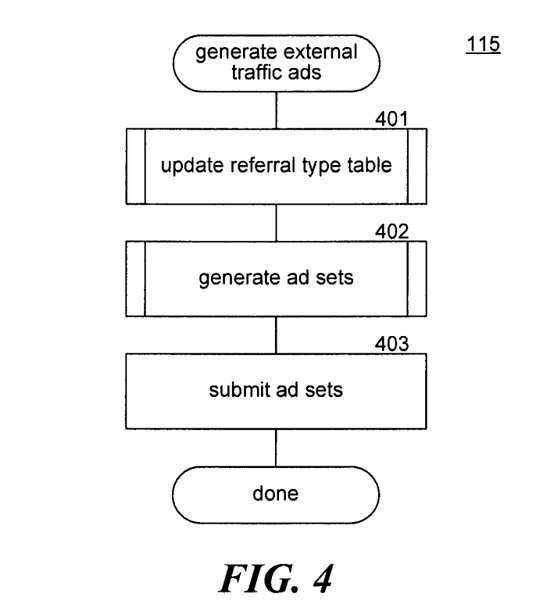
FIG. 4 is a flow diagram that illustrates the processing of a generate external traffic advertisement set component of the external traffic advertisement system in one embodiment.

FIG. 4 is a flow diagram that illustrates the processing of a generate external traffic advertisement sets component 115 of the external traffic advertisement system in one embodiment. The component may execute periodically (e.g., twice a day, daily, or weekly) to generate advertisement sets generated based in part on recent external traffic. In block 401, the component invokes the update referral type table component 116 to update the referral type table 300 based on the recent external traffic. In block 402, the component invokes the generate advertisement sets component 118 to generate advertisement sets based on the updated referral type table 300. In block 403, the component submits the generated advertisement sets to the advertisement placement system 120.

Figure 5:
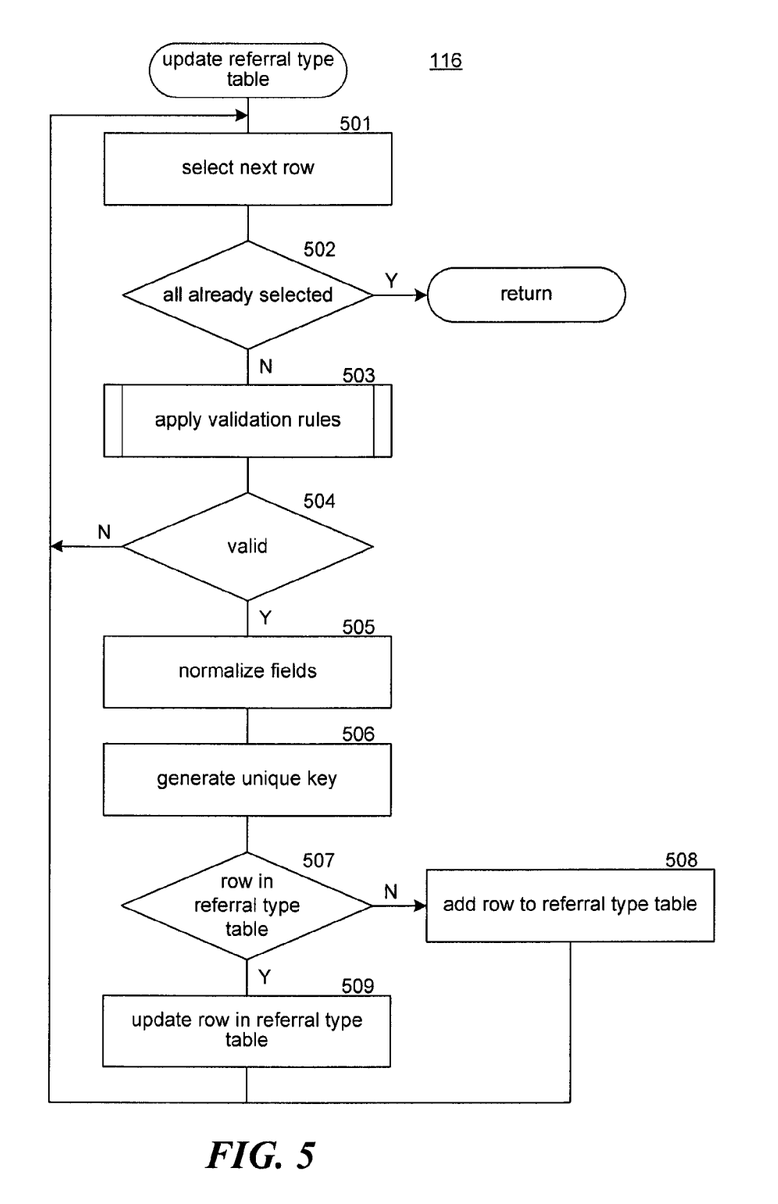
FIG. 5 is a flow diagram that illustrates the processing of an update referral type table component of the external traffic advertisement system in one embodiment.

FIG. 5 is a flow diagram that illustrates the processing of an update referral type table component 116 of the external traffic advertisement system in one embodiment. The component updates the referral type table 300 to reflect the visits of the visits table 200. In blocks 501-509, the component loops selecting each visit row of the visits table 200 and updating the referral type table 300, accordingly. In block 501, the component selects the next visit row of the visits table 200. In decision block 502, if all the visit rows have already been selected, then the component returns, else the component continues at block 503. In block 503, the component invokes the apply validation rules component 117 to validate the data of the selected visit row. In decision block 504, if the data of the selected visit row is valid, then the component continues at block 505, else the component loops to block 501 to select the next visit row of the visits table 200. In block 505, the component normalizes fields of the selected visit row. For example, the component may remove noise words from the query text field of the visit row. In block 506, the component generates a referral type identifier based on the referral type of the selected visit row. In decision block 507, if the referral type table 300 includes a referral type row corresponding to the referral type identifier, then the component continues at block 509, else the component continues at block 508. In block 508, the component adds a referral type row to the referral type table 300 with its revenue field and converting visits field initialized to the value of the selected visit row. In block 509, the component updates the existing row in the referral type table based on the selected visit row. For example, the component may add the revenue of the selected visit row to the revenue field of the referral type row, increment the visits field of the referral type row, and if the revenue field of the selected visit row is not zero, increment the converting visits field of the referral type row. The component then loops to block 501 to select the next visit row of the visits table 200.

Figure 6:
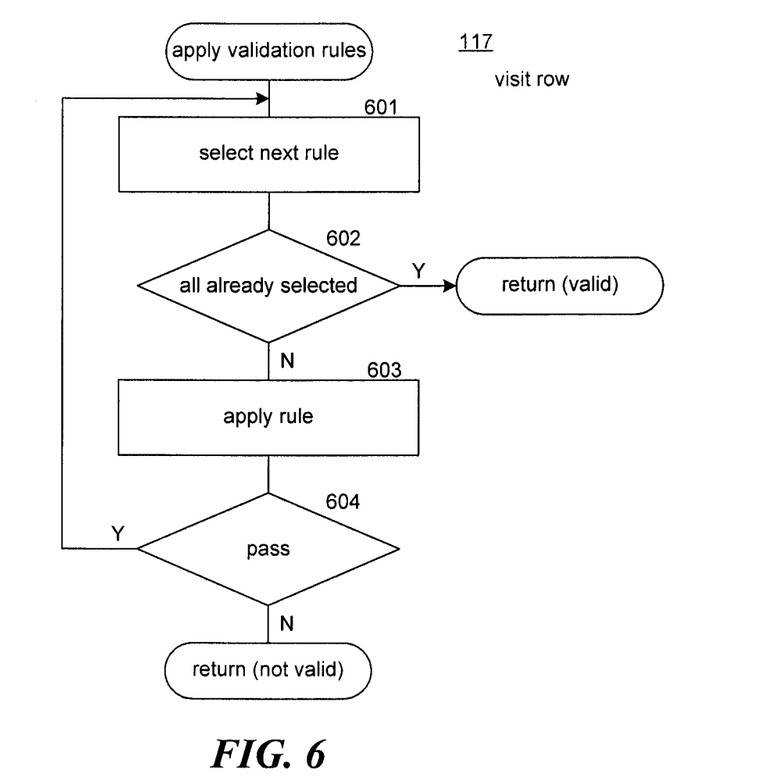
FIG. 6 is a flow diagram that illustrates the processing of an apply validation rules component of the external traffic advertisement system in one embodiment.

FIG. 6 is a flow diagram that illustrates the processing of an apply validation rules component 117 of the external traffic advertisement system in one embodiment. The component is passed a visit row of the visits table 200 and loops applying rules to determine whether the visit row is valid. In block 601, the component selects the next rule. In decision block 602, if all the rules have already been selected, then the component returns an indication that the visit row is valid, else the component continues at block 603. In block 603, the component applies the selected rule to the visit row. In decision block 604, if the visit row passes the validation rule, then the component loops to block 601 to select the next rule, else the component returns an indication that the visit row is not valid. The validation rules may include requiring that the query text of the visit row be not empty, that the product identifier of the visit row for a product detail landing page be not empty, that the browse node identifier of a visit row for a browse node landing page be not empty, and so on. In addition, the component may clean up some of the data of a visit row. For example, the component may clear the query string for visit rows representing a product detail landing page because the query string is not used in a link to a product detail web page. The component may also add source identifiers to groups of source identifiers. For example, the external traffic advertisement system may want to aggregate referral information from multiple referral sources (e.g., search engine services).

Figure 7:
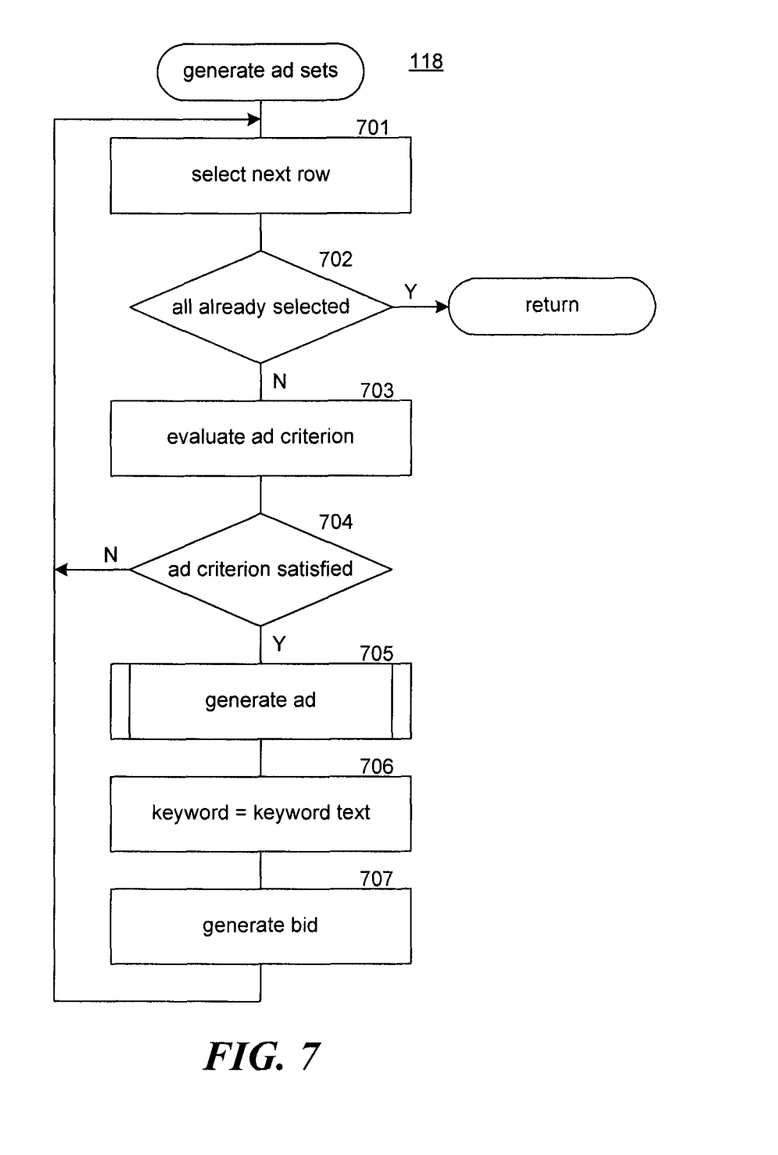
FIG. 7 is a flow diagram that illustrates the processing of a generate advertisement sets component of the external traffic advertisement system in one embodiment.

FIG. 7 is a flow diagram that illustrates the processing of a generate advertisement sets component 118 of the external traffic advertisement system in one embodiment. The component loops through each referral type row of the referral type table 300 and generates an advertisement set for each rule that satisfies an advertising criterion. In block 701, the component selects the next referral type row of the referral type table 300. In decision block 702, if all the referral type rows have already been selected, then the component returns, else the component continues at block 703. In block 703, the component evaluates the advertising criterion. In decision block 704, if the advertising criterion is satisfied, then the component continues at block 705, else the component loops to block 701 to select the next referral type. In block 705, the component invokes the generate advertisement sets component 118 to generate an advertisement for the advertisement set for the selected referral type row. In block 706, the component sets the keyword of the advertisement set to the keyword text field of the selected referral type row. In block 707, the component generates a bid amount for the advertisement set and then loops to block 701 to select the next row of the referral type table.

Figure 8:
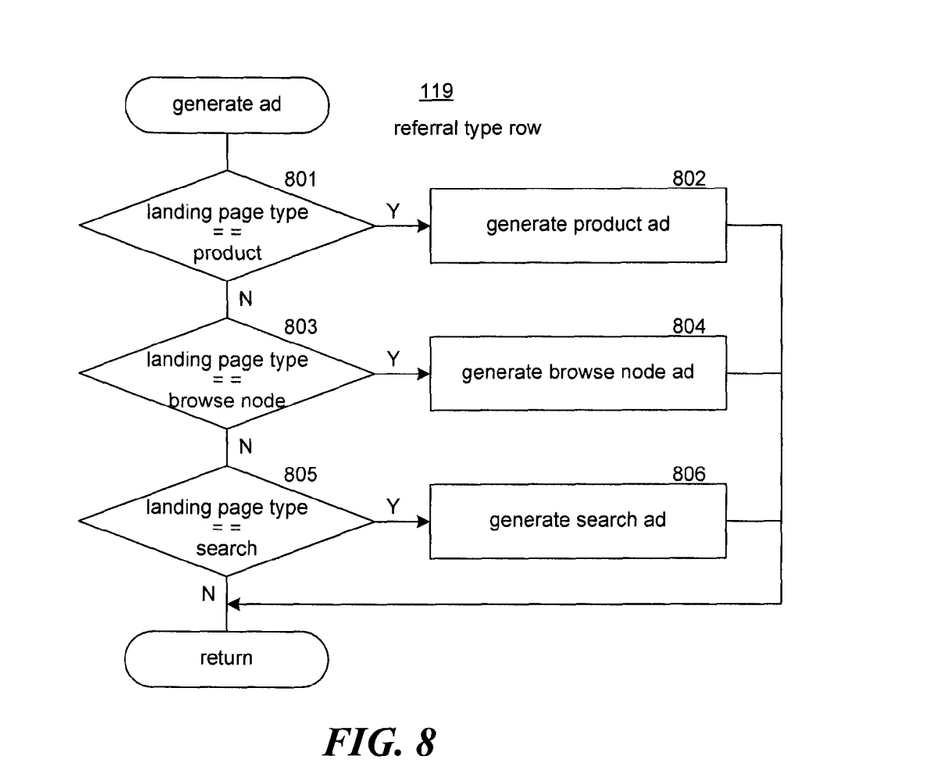
FIG. 8 is a flow diagram that illustrates the processing of a generate advertisement component of the external traffic advertisement system in one embodiment.

FIG. 8 is a flow diagram that illustrates the processing of a generate advertisements component 119 of the external traffic advertisement system in one embodiment. The component is passed a referral type row and generates an advertisement for that referral type. In decision block 801, if the landing page type of the referral type row is product detail, then the component continues at block 802, else the component continues at block 803. In block 802, the component generates an advertisement for the referral type based on the product identifier of the row and creates a link to the product detail web page corresponding to the product identifier of the row. The component then returns. In decision block 803, if the landing page type of the referral type row is browse node, then the component continues at block 804, else the component continues at block 805. In block 804, the component generates a browse node advertisement and generates a link to the browse node indicated in the row passing the query string field of the row as options. The component then returns. In decision block 805, if the landing page type is search, then the component continues at block 806, else the component returns. In block 806, the component generates an advertisement and creates a link to a search page with the keyword text field as the query and passing options from the query string. The component then returns.

One skilled in the art will appreciate that although specific embodiments of the external traffic advertisement system 110 have been described herein for purposes of illustration, various modifications may be made without deviating from the spirit and scope of the invention. The term "item" includes any product, service, or concept that can be advertised. In addition, an advertisement set may not have a link associated with it. An advertiser may want to simply display the information of an advertisement to users who submit requests using a certain search term. The system may use criteria and thresholds that are specific to the categories of items being advertised. Accordingly, the invention is not limited except as by the appended claims.

At least the following is claimed:

1. A computer-implemented method for generating advertisement sets based on analysis of external referrals to a web site, the method comprising:
   under control of one or more computer systems configured with executable instructions,
      collecting information from one or more referring sources that are external to the one or more computer systems and that refer visitors of the referring sources to the website, the information corresponding to referrals to the web site by the referring sources, and each referral comprising referral information corresponding to a request for additional content that is sent responsive to user interaction with content of a corresponding referring source and that resulted in a visit to the website referred to by the corresponding referring source;
      for each of the referrals, identifying a referral type based at least in part upon a unique combination of a landing page type of the referral and one or more elements selected from a referring source identifier and a product identifier, the landing page type identifying a type of landing page that is displayed in response to user interaction with the referral;
      aggregating the referral information for each referral type, the aggregated referral information including a financial metric for the referrals; and
      for each referral type,
         determining whether the aggregated referral information satisfies an advertising criterion;
         when it is determined that the aggregated referral information satisfies an advertisement criterion,
            generating, based at least in part upon the aggregated referral information, an advertisement set for the referral type, the advertisement set having an associated link including a query string corresponding to the referral type, each referral type having at least one corresponding query string; and
            submitting the generated advertisement set to an order placement service.

2. The computer-implemented method of claim 1 wherein the aggregated information includes aggregated revenue and converting visits.

3. The computer-implemented method of claim 2 wherein the advertisement criterion is based on an aggregated revenue threshold.

4. The computer-implemented method of claim 2 wherein the advertisement criterion is based on a converting visits threshold.

5. The computer-implemented method of claim 2 wherein the advertisement criterion is based on conversion rate.

6. The computer-implemented method of claim 1 wherein each referral includes a query text, a query string, and a source identifier.

7. The computer-implemented method of claim 6 wherein the source identifier identifies a group of external sources.

8. The computer-implemented method of claim 1 wherein the financial metric includes an accumulation of revenue generated for a referral type.

9. The computer-implemented method of claim 1 wherein the financial metric includes an indication of converting visits.

10. The computer-implemented method of claim 1 wherein the landing page types include detailed, browse node, and search.

11. The computer-implemented method of claim 1 wherein a link associated with the generated advertisement set is a link to a page of the landing page type.

12. The computer-implemented method of claim 1 wherein the generating of the advertisement set includes calculating a bid amount at least based in part on conversion rate.

13. The computer-implemented method of claim 12 wherein an advertisement set is not submitted to the advertisement placement service when its bid amount does not meet a bid threshold.

14. A computing device for generating advertisement sets based on analysis of external referrals to a web site, comprising:
   at least one processor; and
   memory storing instructions that, when executed by the at least one processor, provide:
      a component that collects information from one or more referring sources that are external to the computing device and that refer visitors of the referring sources to the website, the information corresponding to referrals to the website by the referring sources, and each referral comprising referral information corresponding to a request for additional content that is sent responsive to user interaction with content of a corresponding referring source and that resulted in a visit to the website referred to by the corresponding referring source;
      a component that, for each of the referrals, identifies a referral type based at least in part upon a unique combination of a landing page type of the referral and one or more elements selected from a referring source identifier and a product identifier, the landing page type identifying a type of landing page that is displayed in response to user interaction with the referral;
      a component that aggregates the referral information for each referral type, the aggregated referral information including at least one of aggregated financial information and aggregated conversion information;
      a component that determines whether the aggregated referral information for a referral type satisfies an advertising criterion;
      a component that generates, based at least in part upon the aggregated referral information, an advertisement set for a referral type when its aggregated referral information satisfies an advertisement criterion, the advertisement set having an associated link including a query string corresponding to the referral type; and
      a component that submits the generated advertisement sets to an order placement service.

15. The computing device of claim 14 wherein the aggregated information includes aggregated revenue and converting visits.

16. The computing device of claim 15 wherein the advertisement criterion is based on an aggregated revenue threshold.

17. The computing device of claim 15 wherein the advertisement criterion is based on a converting visits threshold.

18. The computing device of claim 14 wherein each referral includes a query text, a query string, a source identifier, and a product identifier.

19. The computing device of claim 18 wherein the product identifier is empty for landing page types other than detailed.

20. The computing device of claim 19 wherein a link associated with the generated advertisement set is a link to a page of the landing page type.

21. A non-transitory computer-readable medium storing instructions for controlling a computing device to generate advertisement sets based on analysis of external referrals to a web site, the instructions when executed by a processing device causing the processing device to:
   collect information from an external source that is external to the computing device and that refers visitors of the referring source to the website, the information corresponding to referrals by the external source to visit the website, each referral comprising referral information corresponding to a request for additional content that is sent responsive to user interaction with content of the external source and that resulted in the visit to the website;
   for each referral, identify a referral type based at least in part upon a unique combination of a landing page type of the referral and one or more elements selected from a referring source identifier and a product identifier, the landing page type identifying a type of landing page that is displayed in response to user interaction with the referral;
   collect financial information relating to each visit referred by the external source;
   aggregate referral information for each referral type, the aggregated referral information including financial information for the referrals; and
   for at least one referral type,
      generate, based at least in part upon the aggregated referral information, an advertisement set for the referral type that includes a link corresponding to the landing page type of the referral type when the financial information for the referral type satisfies an advertisement criterion, the advertisement set having an associated link including a query string corresponding to the referral type; and
      submit the generated advertisement set for placement.

22. The non-transitory computer-readable medium of claim 21 wherein the aggregated financial information is aggregated revenue and converting visits.

23. The non-transitory computer-readable medium of claim 21 wherein the advertisement criterion is based on an aggregated revenue threshold.

24. The non-transitory computer-readable medium of claim 21 wherein the advertisement criterion is based on a converting visits threshold.

25. The non-transitory computer-readable medium of claim 21 wherein the landing page types include detail, browse node, and search.

26. The non-transitory computer-readable medium of claim 21 wherein a link associated with the generated advertisement set is a link to a page of the landing page type.

\* \* \* \* \*